United States Patent [19]
Horng

[11] Patent Number: 5,492,458
[45] Date of Patent: Feb. 20, 1996

[54] STATOR OF ELECTRIC FAN

[76] Inventor: Alex Horng, No. 3, Lane 45, Yi Yung Road, Kaohsiung, Taiwan

[21] Appl. No.: 369,298

[22] Filed: Jan. 6, 1995

Related U.S. Application Data

[63] Continuation of Ser. No. 177,519, Jan. 4, 1994, abandoned.

[51] Int. Cl.⁶ ............................ F04B 17/00; F04B 35/04; H02K 9/00; H02K 1/12
[52] U.S. Cl. ...................... 417/423.7; 417/354; 310/62; 310/254
[58] Field of Search ................................ 417/423.7, 354; 310/62, 63, 254; 403/282

[56] References Cited

U.S. PATENT DOCUMENTS

| | | | |
|---|---|---|---|
| 869,901 | 11/1907 | Hahn | 403/282 |
| 2,742,223 | 4/1956 | Font | 417/354 |
| 4,360,498 | 12/1986 | Santi | 403/282 |
| 4,376,333 | 4/1983 | Kanamaru et al. | 403/282 |
| 4,959,571 | 9/1990 | Yasumoto et al. | 310/63 |
| 4,987,331 | 1/1991 | Horng | 310/254 |
| 5,019,735 | 5/1991 | Lee | 310/62 |
| 5,099,181 | 3/1992 | Canon | 417/354 |
| 5,272,930 | 12/1993 | Nakamura et al. | 403/282 |
| 5,288,216 | 2/1994 | Bolte | 417/423.7 |

*Primary Examiner*—Richard A. Bertsch
*Assistant Examiner*—Ted Kim
*Attorney, Agent, or Firm*—Jacobson, Price, Holman & Stern

[57] ABSTRACT

An electric fan includes a housing having a hub formed in the center, a shaft has one end force-fitted in the hub and having an annular flange formed in the other end, two polar plate are force-fitted on the shaft, and a stator is disposed between the polar plates. The upper polar plate and the lower polar plate each includes a hole for engaging with the shaft and the holes have one or more teeth for solidly engaging with the shaft.

4 Claims, 4 Drawing Sheets

STATOR OF ELECTRIC FAN

This is a continuation of application Ser. No. 08/177,519, filed Jan. 4, 1994 which was abandoned upon the filing hereof.

BACKGROUND OF THE INVENTION

1. Field of the Invention

The present invention relates to an electric fan, and more particularly to a stator of an electric fan.

2. Description of the Prior Art

A typical electric fan is shown in FIG. 8 and comprises a rotor A rotatably supported in an axle of a housing D by a bearing B, and a stator C engaged in the rotor A, however, the axle is integrally formed in the housing D, and the space within the housing D is compact such that it will be very difficult to assemble the stator C and the rotor A within the housing D.

The present invention has arisen to mitigate and/or obviate the afore-described disadvantages of the conventional stators of the electric fans.

SUMMARY OF THE INVENTION

The primary objective of the present invention is to provide a stator which can be easily assembled within the housing of the electric fan.

In accordance with one aspect of the invention, there is provided an electric fan comprising a housing including a center having a hub formed therein, a shaft including a first end force-fitted in the hub, a second end having an annular flange formed therein, and a center portion having an enlarged portion formed thereon, an electric board and a lower polar plate force-fitted on the first end of the shaft, a stator engaged on the enlarged portion, and an upper polar plate force-fitted on the annular flange so as to stably retain the stator between the upper polar plate and the lower polar plate. The upper polar plate and the lower polar plate each includes a hole formed therein for engaging with the shaft and having at least one tooth formed therein for solidly engaging with the shaft.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
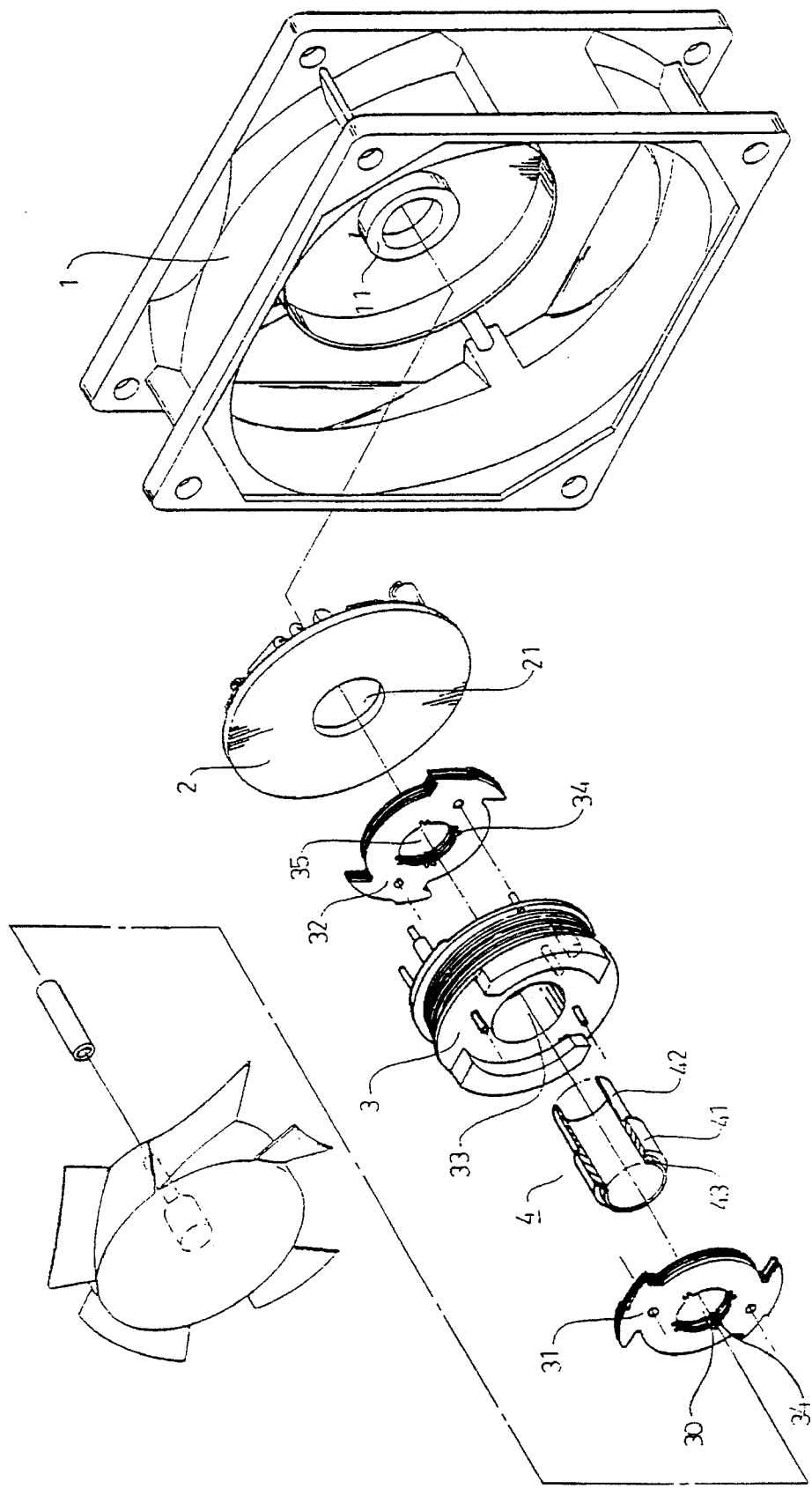
FIG. 1 is an exploded view of an electric fan in accordance with the present invention.

Referring to the drawings, and initially to FIG. 1, an electric fan in accordance with the present invention comprises a housing 1 having a hub 11 provided in the center thereof, an electric board 2 and a stator 3 to be engaged within the housing 1 by a shaft 4, the electric board 2 includes a center hole 21 formed therein for aligning with the hub 11 of the housing 1, the shaft 4 includes a reduced diameter portion 42 engaged with the hole 21 and engaged in the hub 11 by force-fitted engagement, and includes an enlarged portion 41 and an annular flange 43.

The stator 3 includes a center hole 33 for engaging with the enlarged port ion 42 of the shaft 4, the center hole 33 has an inner diameter slightly larger than the outer diameter of the enlarged portion 42 of the shaft 4, the stator further includes an upper polar plate 31 and a lower polar plate 32 each having a center hole 30, 35 formed therein, in which the center hole 30 of the upper polar plate 31 is slightly smaller than the outer diameter of the annular flange 43 of the shaft 4 such that the upper polar plate 31 can be engaged on the annular flange 43 by force-fitted engagement, and the center hole 35 of the lower polar plate 32 is force-fitted on the reduced diameter portion 42 of the shaft 4, the center holes 30, 35 of the polar plates 32, 31 may further be provided with teeth 34 therein for further solidly engaging with the shaft 4, whereby, the stator 3 can be solidly retained between the polar plates 31, 32. As FIG. 1 clearly illustrates, the teeth 34 can be formed by creating several pairs of closely spaced slits in the upper and lower polar plates 31,32. Preferably, there are a total of four pairs of slits, each pair being equally spaced from the others about the inner circumference of the polar plates 31,32. The teeth 34 are defined between the pairs of slits. According to the preferred arrangement of FIG. 1, the slits are directed radially out from the center holes 30 and 35, and have a longitudinal length parallel to the longitudinal axis of the shaft 4.

Figure 2:
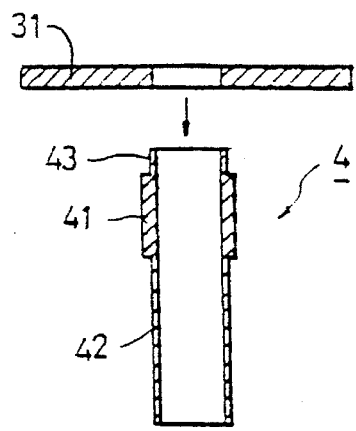
FIGS. 2 to 7 are cross sectional views illustrating the configuration of the stator.
Figure 3:
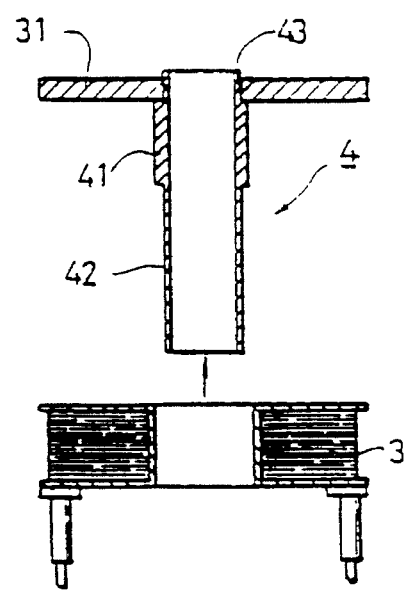
Figure 4:
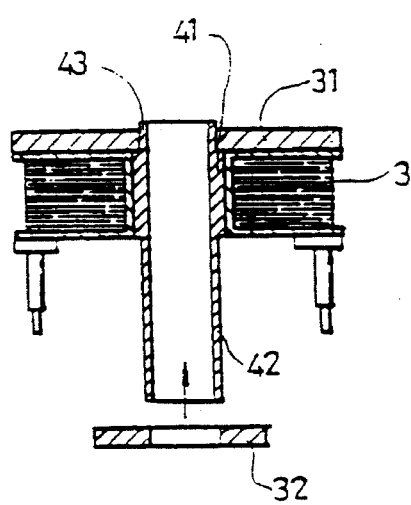
Figure 5:
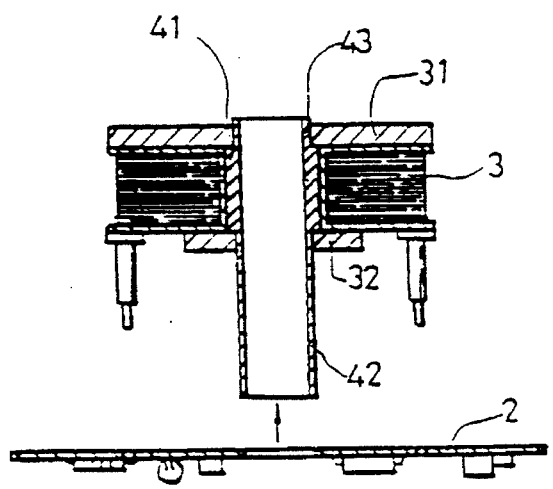
Figure 6:
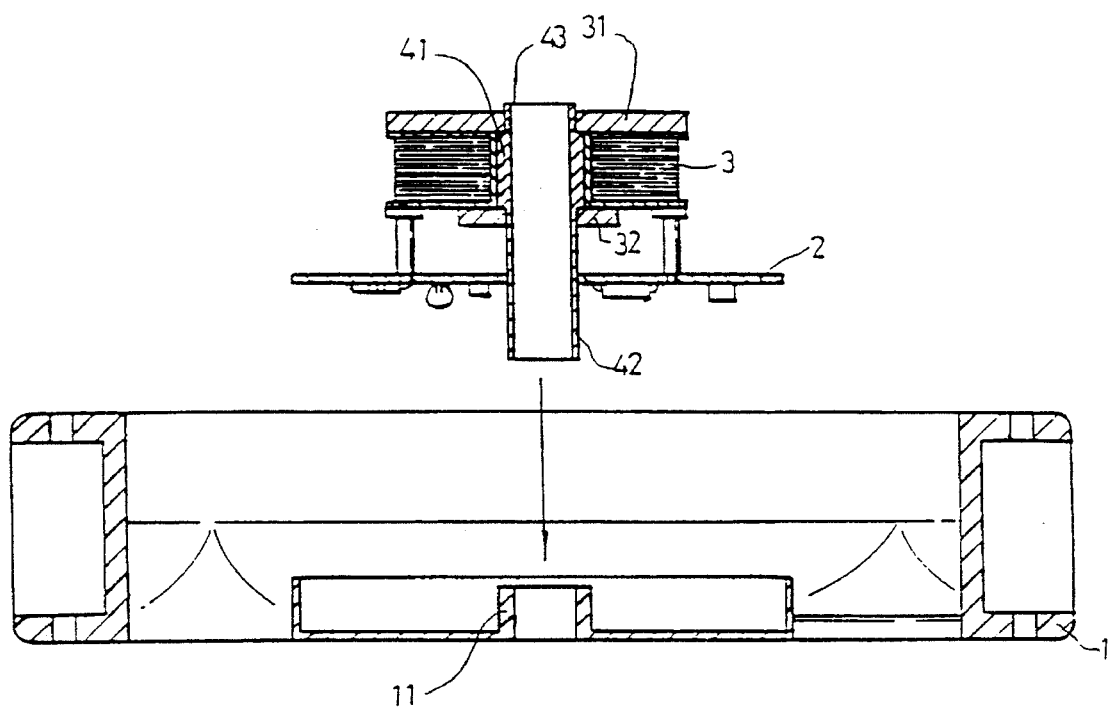
Figure 7:
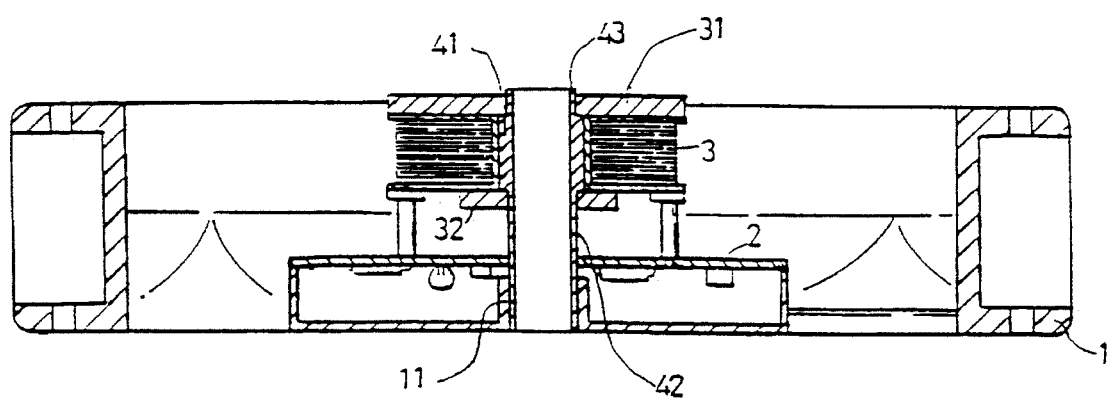
Figure 8:
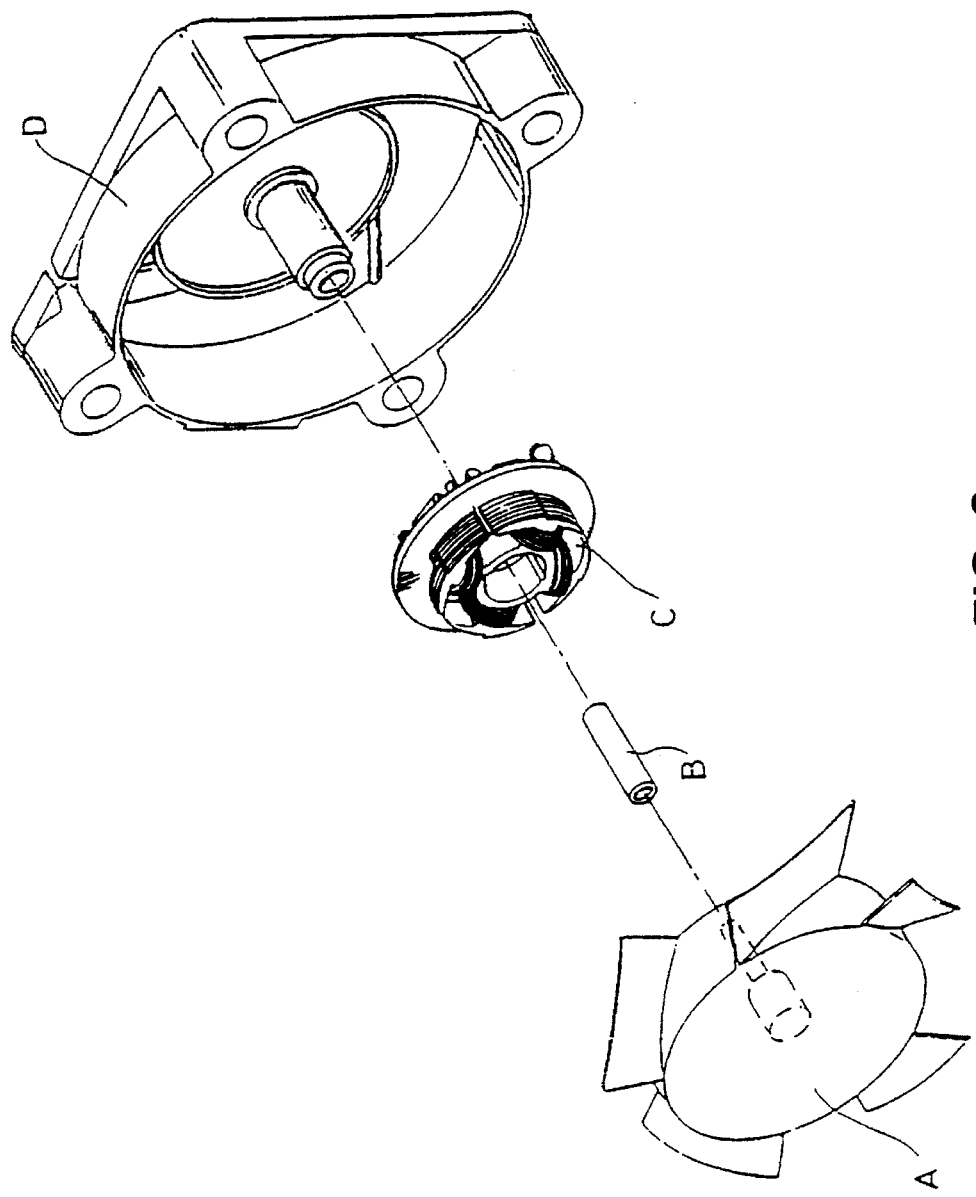
FIG. 8 is an exploded view of the typical electric fan.

In assembling the stator 3, the upper polar plate 31 is firstly engaged on the annular flange 43 of the shaft 4 (FIG. 2), the stator 3 is then engaged on the enlarged portion 41 of the shaft 4 (FIG. 3), the lower polar plate 32 and the electric board 2 are then force-fitted on the reduced diameter portion of the shaft 4 (FIGS. 4 and 5), the reduced diameter portion of the shaft 4 is then force-fitted into the hub 11 of the housing 1 (FIGS. 6 and 7) such that the polar plates 31, 32, the stator 3, the electric board 2 and the shaft 4 can be easily engaged and assembled within the housing 1.

Accordingly, the electric fan in accordance with the present invention includes a stator which has a configuration that can be easily engaged and assembled within the housing, such that the electric fan can be easily manufactured.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An electric fan comprising:

a housing including a center having a hub formed therein, a shaft including a first end force-fitted in said hub, a second end having an annular flange formed therein, and a center portion having an enlarged portion formed thereon, said enlarged portion having a larger outer diameter than that of the annular flange and the first end, an electric board including a first center hole force-fitted on said first end of said shaft, a lower polar plate including a second center hole force-fitted on said first end of said shaft, a stator including a third center hole engaged on said enlarged portion, and an upper polar plate including a fourth center hole force-fitted on said annular flange so as to stably retain said stator between said upper polar plate and said lower polar plate, said fourth center hole of said upper polar plate and said second center hole of said lower polar plate each including at least one tooth formed therein for engaging with said shaft so as to be solidly secured to said shaft and so as to solidly retain said stator between said upper and said lower polar plates, and wherein said at least one tooth is defined by at least two pairs of slits which extend radially out from each of said fourth center hole and said second center hole, said at least two pairs of slits having a longitudinal length parallel to a longitudinal axis of the shaft, said at least one tooth being defined between said at least two pairs of slits.

2. The electric fan of claim 1, wherein said enlarged portion is formed integrally with said shaft to prevent relative rotation between the shaft and enlarged portion and to facilitate assembly of the electric fan.

3. An electric fan comprising:

a housing including a center having a hub formed therein, a shaft including a first end force-fitted in said hub, a second end having an annular flange formed therein, and a center portion having an enlarged portion formed thereon, said enlarged portion having a larger outer diameter than that of the annular flange and the first end, an electric board including a first center hole force-fitted on said first end of said shaft, a lower polar plate including a second center hole force-fitted on said first end of said shaft, a stator including a third center hole engaged on said enlarged portion, and an upper polar plate including a fourth center hole force-fitted on said annular flange so as to stably retain said stator between said upper polar plate and said lower polar plate, said fourth center hole of said upper polar plate and said second center hole of said lower polar plate each including at least one tooth formed therein for engaging with said shaft so as to be solidly secured to said shaft and so as to solidly retain said stator between said upper and said lower polar plates, and wherein said at least one tooth comprises four teeth in each of said fourth center hole and said second center hole, said four teeth being defined in each of said fourth and second center holes by four pairs of slits, said four pairs of slits being equally spaced about the fourth center hole and about the second center hole and extending radially out therefrom, said four pairs of slits having a longitudinal length parallel to a longitudinal axis of the shaft.

4. The electric fan of claim 3, wherein said enlarged portion is formed integrally with said shaft to prevent relative rotation between the shaft and enlarged portion and to facilitate assembly of the electric fan.

* * * * *